Dec. 21, 1926.
W. DISHONG
RAIL JOINT
Filed Oct. 6, 1925
1,611,168
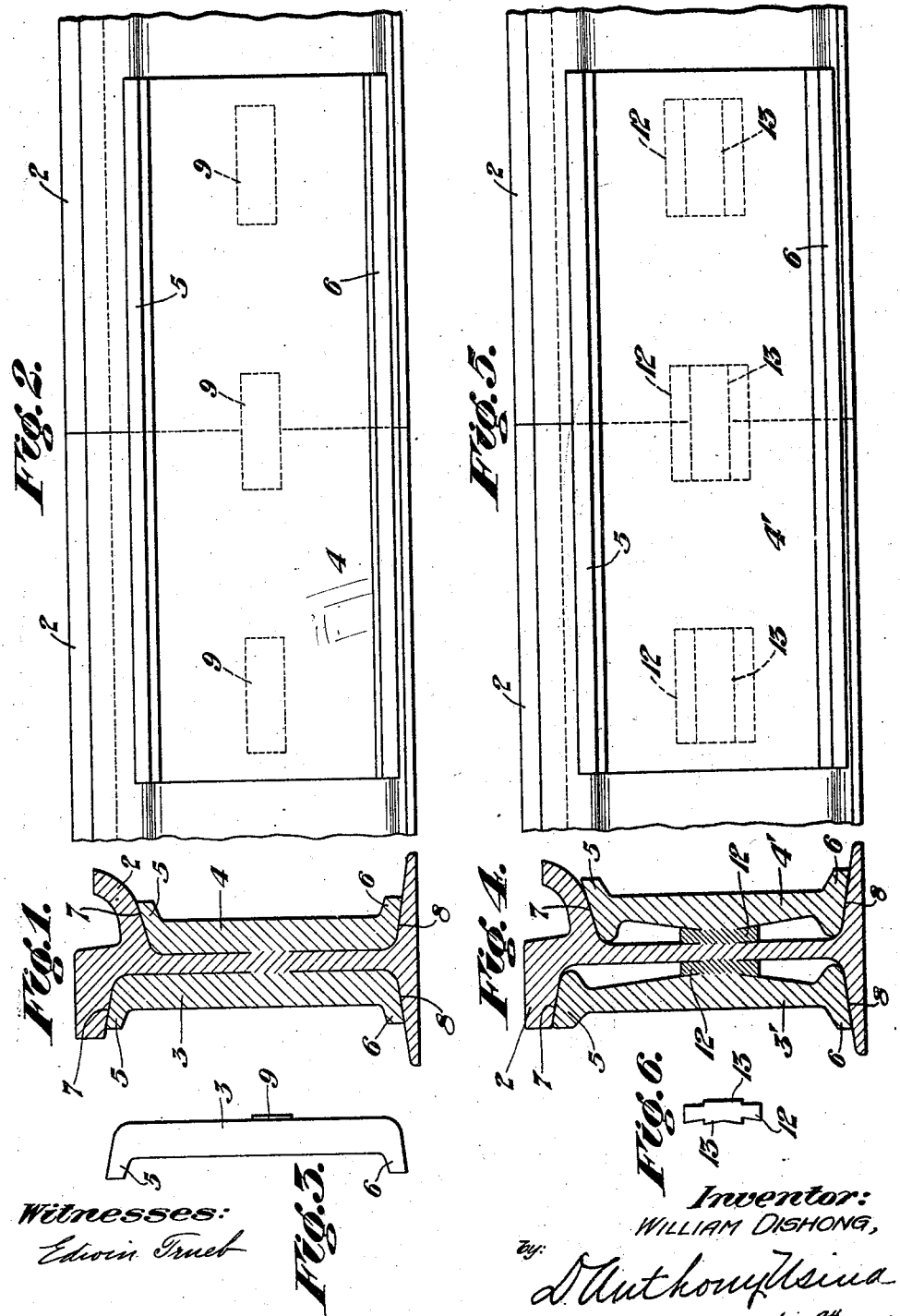
Witnesses:
Edwin Trueb
Inventor:
WILLIAM DISHONG,
By: D. Anthony Usina
his Attorney.

Patented Dec. 21, 1926.

1,611,168

UNITED STATES PATENT OFFICE.

WILLIAM DISHONG, OF JOHNSTOWN, PENNSYLVANIA.

RAIL JOINT.

Application filed October 6, 1925. Serial No. 60,804.

This invention relates to welded rail joints and more particularly to welded rail joints for what is known as continuous railway track.

One object of the present invention is to provide a rail joint which retains all the advantages of a vertical support through the fit of the splice bars against the fishing surfaces of the rail, while also having the added advantage of providing bars which are an integral part of the rail through being welded thereto, thus providing a joint of high electrical efficiency and one that is of a permanent structure.

Another object is to provide a joint in which the welds are made along the line of the neutral axis of the cross-section of the rails and splice bars, whereby the welds will be more durable, due to there being less fatigue at this point of juncture.

A further object is to provide a rail joint having the novel design, combination, and construction of parts hereinafter described in detail and illustrated in the accompanying drawings.

In the drawings—

Figure 1 is a sectional elevation through a rail joint embodying this invention.

Figure 2 is a side elevation thereof.

Figure 3 is an end elevation of one of the fish plates used in forming the joint.

Figure 4 is a sectional elevation through a slightly modified form of joint.

Figure 5 is a side elevation thereof.

Figure 6 is an elevation of one of the inserts used in forming the joint of Figures 5 and 6.

Referring more particularly to the drawings, the numeral 2 designates the track rails which are arranged end to end in alinement in the usual manner. A pair of splice bars 3 and 4 are arranged one on each side of the rails 2 and extend a considerable distance in each direction beyond the junction point of the rails.

The bars 3 and 4 are provided with longitudinal edge flanges 5 and 6, adapted to engage the fishing surfaces 7 and 8 of the rails, thus forming a vertical support for the rails 2.

The splice bars 3 and 4 will preferably be rolled so that they fit closely to the web of the rail, as shown in Figure 1, and will be provided with slightly projecting weld buttons 9, as shown in Figure 3, in order to concentrate the heat at these points in the process of welding. The buttons 9 may be formed either by rolling, forging or any other desired manner, or may be omitted and separate small pieces of metal inserted between the splice bars and rail webs instead.

After the joint has been assembled, electric current is caused to pass through the parts until the buttons 9 become heated to a welding heat, and pressure is then applied to force the splice bars inwardly against the rail web, forming a solid weld.

Attention is especially directed to the location and form of the welds. The weld buttons 9 are positioned one adjacent each end of the bars 3 and 4 and one at the center, so as to extend over the junction point of the rails 2 and form a welded connection with both rails. The rectangular shape of the welds also provides a maximum strength.

When desired the splice bars may be made of standard design, as shown in Figure 4 and designated by 3' and 4'. The bars 3' and 4' are not provided with the projections 9, but inserts 12 of material thickness are provided which are positioned between the inner faces of the bars and the rail webs. The inserts 12 are provided with elongated projections 13 on both sides, so that contact between the rail web and inserts, and between the inner surfaces of the splice bars and inserts will be confined to the projections 13 to concentrate the heat and confine the welds to these projections. The portions of the inserts 12 beyond the projections 13 serve as fillers to prevent the bars 3' and 4' from being forced in too far, which would result in distorting the fishing bearing or longitudinal edge flanges of the bars.

The inserts 12 are positioned in the same relative position as the buttons 9 so as to form welds adjacent each end of the splice bars and one weld at the junction of the track rails 2.

I claim—

1. The combination with a pair of track rails arranged end to end, of a pair of splice bars fitting the top and bottom fishing surfaces of said rails, said bars being arranged on the opposite sides of said rails and extending longitudinally in both directions beyond the juncture of said rails, said bars being welded at a plurality of points to the web portion of said rails along the neutral axis of the rails, and at least one of said points of welding extending across the junction point of said rails.

2. The combination with a pair of track rails arranged end to end, of a pair of splice bars fitting the top and bottom finishing surfaces of said rails, said bars being arranged on the opposite sides of said rails and extending longitudinally in both directions beyond the juncture of said rails, each of said splice bars being welded to the web portion of both rails at internal points on the neutral axis of the rails, so as to secure said splice bars and rails together by welding alone without the use of rivets or bolts, and at least one of said points of welding extending across the junction point of said rails.

In testimony whereof, I have hereunto set my hand.

WILLIAM DISHONG.